US007533800B2

(12) United States Patent
Tripp et al.

(10) Patent No.: US 7,533,800 B2

(45) Date of Patent: May 19, 2009

(54) TRANSPORT AND DELIVERY SYSTEM FOR VALUABLE ITEMS

(75) Inventors: Nicholas Tripp, Plymouth (GB); Timothy Ord, Plymouth (GB)

(73) Assignee: Oberthur Cash Protection, Paris (FR)

( * ) Notice: Subject to any disclaimer, the term of this patent is extended or adjusted under 35 U.S.C. 154(b) by 326 days.

(21) Appl. No.: 10/979,386

(22) Filed: Nov. 2, 2004

(65) Prior Publication Data

US 2005/0116032 A1 Jun. 2, 2005

(30) Foreign Application Priority Data

Nov. 4, 2003 (GB) ................................ 0325734.2

(51) Int. Cl.
*G06Q 40/00* (2006.01)

(52) U.S. Cl. ........................ 235/379; 235/381; 235/385

(58) Field of Classification Search ................. 235/379, 235/383, 381, 385
See application file for complete search history.

(56) References Cited

U.S. PATENT DOCUMENTS

| | | | | |
|---|---|---|---|---|
| 5,563,393 A | | 10/1996 | Coutts | |
| 6,502,746 B1 | | 1/2003 | Do et al. | |
| 6,547,151 B1 | * | 4/2003 | Baldi | 235/492 |
| 6,935,558 B2 | * | 8/2005 | Washington et al. | 235/380 |
| 2003/0006121 A1 | | 1/2003 | Lee et al. | |
| 2004/0169075 A1 | * | 9/2004 | Washington et al. | 235/379 |

FOREIGN PATENT DOCUMENTS

| | | |
|---|---|---|
| DE | 196 19 851 A1 | 6/1997 |
| DE | 196 30 648 A1 | 2/1998 |
| DE | 101 63 267 A1 | 7/2003 |
| EP | 1 179 811 A1 | 2/2002 |
| GB | 2 244 838 A | 12/1991 |

* cited by examiner

*Primary Examiner*—Ahshik Kim
(74) *Attorney, Agent, or Firm*—Young & Thompson

(57) ABSTRACT

A transport system for valuable items comprises a portable container for carrying one or more valuable items therein and an enclosure arranged to receive the portable container. The portable container includes a transponder and the enclosure includes a transponder detector arranged to detect the presence of the transponder included in the portable container.

15 Claims, 2 Drawing Sheets

FIG. 1
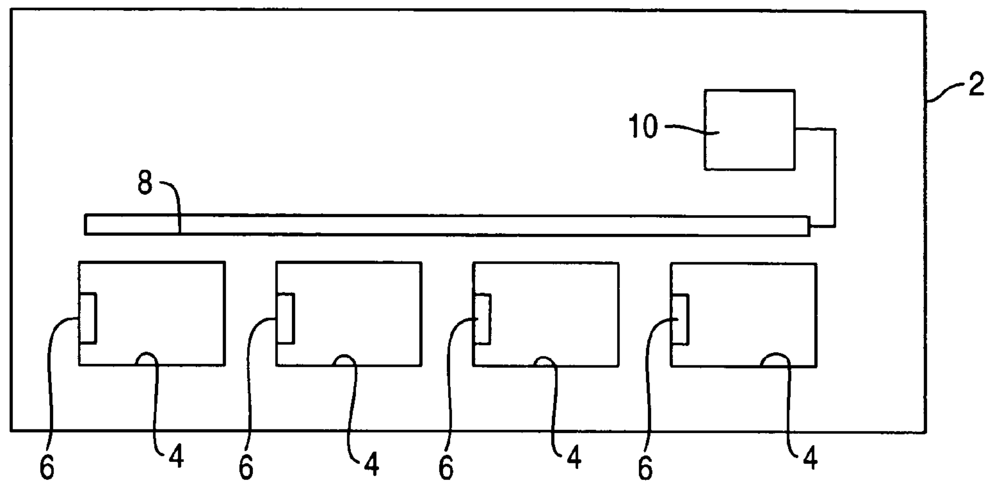
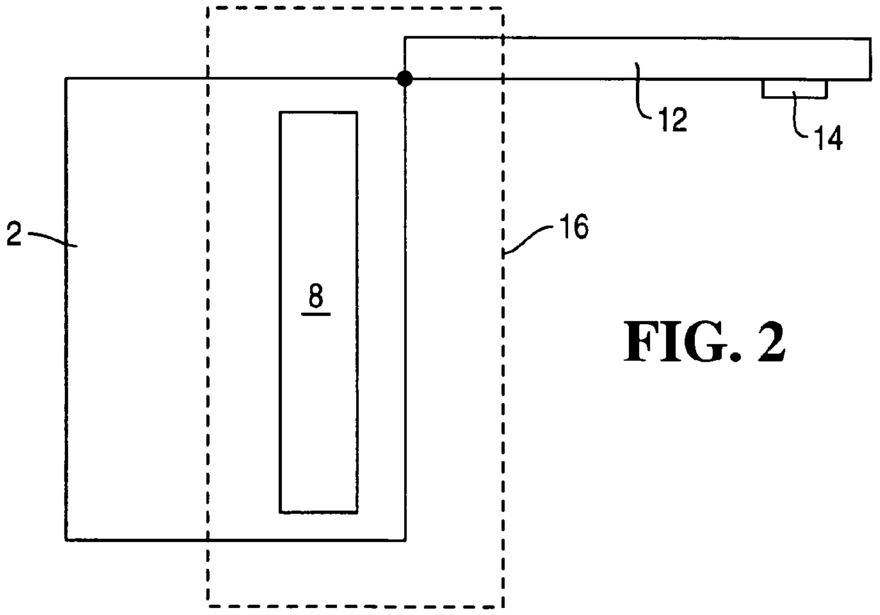
FIG. 2

TRANSPORT AND DELIVERY SYSTEM FOR VALUABLE ITEMS

BACKGROUND OF THE INVENTION

The present application relates to a transport and delivery system for valuables and particularly, but not exclusively, to a system for the transport and delivery of bank notes.

Various organizations have a need to transport valuable items of one kind or another between physically separated locations in a secure manner. Possibly the most common example of this requirement is the transfer of bank notes from a central or local storage point to one or more automatic teller machines (ATM). The bank notes dispensed by an ATM are held in individual cassettes, each cassette containing a bank note of one particular value. Due to the popularity of ATMs they require frequent restocking of bank notes and therefore a relatively large amount of money is generally in transport between one or more banks and the number of ATMs. The secure transport of this money is naturally of great concern to the banking organization.

It will also be appreciated that the transport of other valuable items in a secure fashion is required. For example, it may be required to transfer items of jewellery in a secure manner between a jewellery store and an individual's own premises, or the transport of safety deposit boxes between individual storage facilities.

However, the transport and distribution of bank notes in conjunction with ATMs present particular problems. Typically, the bank notes are transported in the cassettes that themselves are to be fitted within the ATMs. Whilst the cassettes may include security features to prevent the cassettes themselves being forcibly opened to gain access to the bank notes, for example in ink spoiling systems, there is very limited ability provided to establish a secure relationship between the cassettes and the host ATM. Furthermore, the security systems generally known in the art still provide the opportunity for an incorrect cassette to be placed in an ATM. By "incorrect", it is meant that, for example, a cassette containing bank notes of a first value or denomination are placed in a region of the ATM intended for bank notes of a second value or denomination. Additionally, it is common practice when loading the cassettes into an ATM for the total value of the bank notes held within a particular cassette to be entered by an operator into the ATM system, generally by keying in the value on a keypad. As well as providing a record of the value of bank notes deposited into an ATM, this allows the ATM system to deduce when notes to a predetermined value have been dispensed, for example to issue an alarm that notes of that value will soon be exhausted from the cassette. The opportunity therefore also exists for incorrect cassette content values to be keyed in.

SUMMARY OF THE INVENTION

According to a first aspect of the present invention there is provided a transport system for valuable items comprising a portable container for carrying one or more items and an enclosure arranged to receive the portable container therein, wherein the portable container comprises a transponder and the enclosure comprises a transponder detector arranged to detect the presence of the transponder.

Preferably, the transponder comprises a radio frequency identity (RFID) tag.

Additionally or alternatively, the transponder detector may comprise an antenna arranged such that the transponder detector is capable of detecting the portable container when the portable container is located within the enclosure or in close proximity to the enclosure. This allows the absence of the portable container to be determined by the transponder detector.

Additionally or alternatively, the transponder may be arranged to transmit at least one item of data uniquely associated with the portable container when the portable container is within range of the transponder detector. The uniquely associated item of data may, for example, be a unique identity number. Additionally, further data such as date of issue or expiry date may be transmitted.

Additionally, the transponder detector may comprise verification means for verifying that the item of data uniquely associated with the portable container is valid.

Furthermore, the verification means may comprise a data storage device having at least one valid data item stored thereon and comparison means arranged to compare the item of data transmitted by the transponder with the at least one stored valid data item. Additionally or alternatively, the enclosure of the transport system may comprise a movable portion, for example a hinged door, that in a first position prevents access to and from the enclosure, the movable portion comprising a further transponder arranged such that when the movable portion is not substantially in the first position the further transponder is not detectable by the transponder detector. The transport system is thus able to detect whether or not a door to the enclosure is closed or not.

Additionally or alternatively, the transponder detector may comprise an interface arranged to output at least one alarm signal generated by the transponder detector. The alarm signal may be generated in response to an unsuccessful verification of the data item associated with a container or the unauthorized opening of the enclosure door.

The verification means may be arranged to be in communication with a communications network and is arranged to receive data relating to the portable container via the communications network.

Additionally or alternatively, at least one of the valuable items located within the portable container may have a further transponder attached thereto. Additionally, the further transponder may be arranged to transmit to the transponder detector the value of the items within the portable container. Preferably, the transponder detector is in communication with a data entry device arranged to receive a user input of the value of the items within the portable container, the transponder detector being further arranged to verify the user input value with the value received from the further transponder. In this manner data entry provided by a user can be checked against the value provided by the transponder attached to one of the items within the container.

BRIEF DESCRIPTION OF THE DRAWINGS

An embodiment of the present invention is described below, by way of illustrative example only, with reference to the accompanying figures, of which:

FIG. 1 schematically illustrates an ATM equipped with apparatus according to an embodiment of the present invention;

FIG. 2 schematically illustrates the interaction between the antenna of the system shown in FIG. 1 and the door of the ATM;

DETAILED DESCRIPTION

Figure 3:
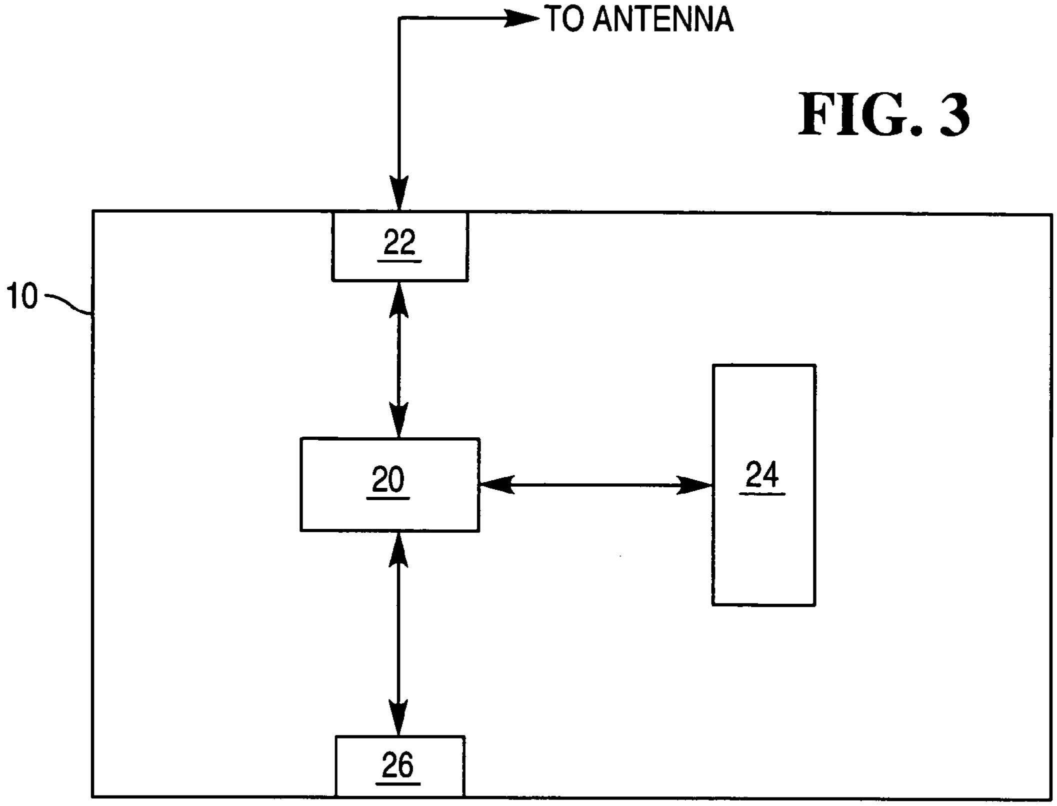
FIG. 3 schematically illustrates the components comprising the electronic unit of FIG. 1.

An embodiment of the present invention is illustrated in FIG. 1. An automatic teller machine (ATM), also referred to as a cash dispenser, comprises a housing 2 in which are located a number of cassettes 4 each housing a plurality of bank notes of a particular value. The cassettes 4 interface with a bank note retrieval and dispensing mechanism, known in the art as a "pick unit" (not shown), that enables any combination of bank notes to be retrieved from the cassettes 4 and dispensed from the ATM in an conventional manner. A radio frequency identity tag (RFID) 6 is fitted to the inside of each cassette wall close to the front or handle end of the cassette. According to preferred embodiments of the present invention, the RFID tags are high frequency (HF) active tags with a normal read-write range of a few centimeters and are in the form of a self-adhering labels. The tags are fixed in place with a permanent adhesive, which ensures that the tag is damaged if attempts are made to remove it. Also located inside the ATM housing 2 is an elongate copper tracked antenna 8 in communication with an electronics module 10. The antenna 8 is dimensioned to span the cassettes 4 in the ATM such that communication can be established between an individual tag 6 and the electronics module 10. With reference to FIG. 2, the ATM housing 2 is provided with a side hinged door 12. A further RFID tag 14 is secured to the door, preferably on the opposite side to the door hinge, such that when the door is open, as shown in FIG. 2, the RFID tag 14 is outside the range of the antenna 8, as indicated by the chained line 16 in FIG. 2.

FIG. 3 schematically illustrates some of the components comprising the electronic module 10. A processor 20 is provided that controls the operation of the electronics module. A read-write module 22 is also provided in communication with the processor 20. The read-write module 22 is in further communication with the antenna 8 and allows data to be written or read to and from the RFID tags 6, 14 via the antenna 8 under the control of the processor 20. A memory device 24, preferably non-volatile, is also provided in communication with the processor 20. Memory device 24 stores information read and/or written to/from the RFID tags, as well as instructions to be executed by the processor 20 for the correct operation of the module 10. An alarm interface 26 is provided, again in communication with the processor 20, that allows alarms to be triggered by the processor 20 if it is determined that certain alarm conditions have been met. The electronics module 10 may receive power from the ATM equipment, or may be separately powered, for example by means of a battery. In preferred embodiments, the electronics module 10 is arranged to receive power from both sources, with a provided battery being intended as an emergency power source, thus preventing the RFID security features to be disabled by disconnecting the ATM power supply.

The composition and operation of the RFID tags themselves is entirely in accordance with the known art. Suffice it to say that the tags themselves have no internal power source and operate by extracting energy from an incident radiation beam, for example by rectifying a received sinusoidal signal. As the construction and operation of the RFID tags is entirely conventional no further discussion or explanation is made in this document.

In operation, the electronics module 10 is programmed with a unique identifier that allows a comparison against delivered cassettes 4. The identifier may be a unique code specific to a particular cassette, particular delivery or the particular value of the cassette contents. Other unique identifiers may also be used. With the door 12 of the ATM housing 2 closed, electronics module 10 is able to continually read the information held on the RFID tags 6, using the antenna 8, of all of the cassettes 4 that are present, as well as the presence of the door tag 14. If verification of the cassette tag 6 against the stored identifier is not successful, or the cassette is withdrawn from the ATM housing 2 without appropriate authorization, the electronics module 10 may cause one or more alarms to be triggered by means of the alarm interface 26. In some embodiments activation of a spoiling agent, such as an indelible ink spray, either within the cassette 4 or external to the cassette, i.e. ATM based, may occur in addition or as an alternative to the alarm activation. Data can also be written from the electronics module 10 to the tags during this period. Loss of a tag from the antenna field is registered as a cassette being withdrawn from the ATM housing 2, if the ATM door tag 14 is also detected as being absent from the antenna field, i.e. the door 12 is open. By appropriately programming the RFID tags 6 on the cassettes 4, together with the electronics module 10 within the ATM, a number of security features can be provided. Cassettes inserted into the ATM can be validated as appropriate to the machine by comparison of programmed identifiers, without the need for powered electronics or a hard interface between the cassette and the ATM. Cassette content values may be read from the RFID tag and validated against an operator entered value to prevent keying errors. If the ATM is connected to a central network, as is generally the case, the ATM may be remotely interrogated concerning the identity of cassettes loaded in the ATM to ensure particular cassettes have been delivered to the correct ATM. Alternatively, or in addition, the RFID tag 6 may be programmed with the time and/or date that the associated cassette 4 was loaded with bank notes. On loading the cassette into an ATM this data can be used by the electronics module to determine the amount of time expired since the cassette was filled and if in excess of a predetermined value an alarm may be triggered. The permitted time interval may also be stored by RFID tag 6 to allow different time intervals to apply for different cassettes. The ability to transfer data from the ATM to the cassette tag 6 allows a comprehensive record of usage and transport data to be associated with particular cassettes. The provision of the door tag 14 allows the presence of the door 12 to be verified without the need for wiring looms or switches, as are commonly provided in the prior art. This is advantageous as the system cannot be overridden as is the case with conventional door switches used for security protection systems.

Figure 4:
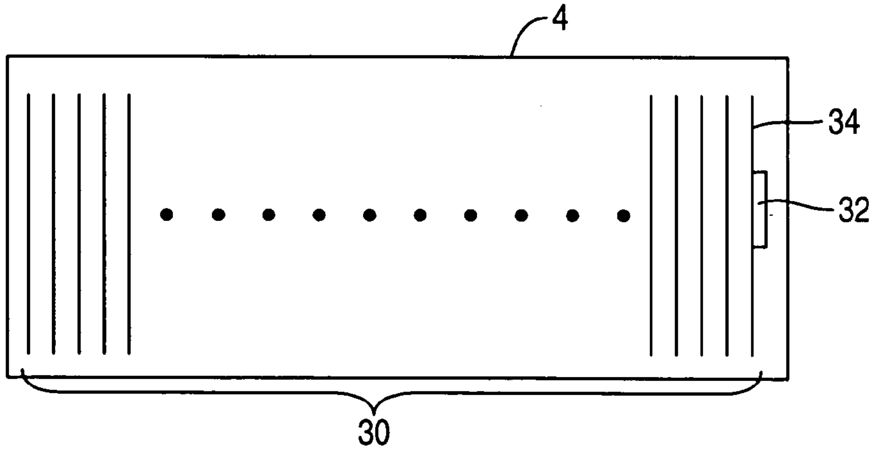
FIG. 4 schematically illustrates the RF-tagging of a bank note within a cassette according to an embodiment of the present invention.

A further embodiment of the present invention is illustrated in FIG. 4. A cassette 4 is illustrated loaded with a plurality of bank notes 30. An additional RFID tag 32 is applied to the last loaded note 34 in the cassette. This is used to validate the integrity of the cassette itself. As the cassette 4 is loaded to the ATM 2, the electronics module 10 is able to confirm the presence of the cassette 4 and check its validity based upon the last tagged note 34 being present. This check may take the form of a specific ID passed to the electronics module 10 when the cassette tag 6 (not shown in FIG. 4) is read, or a special ID given to all bank note tags 32 to indicate the end of the bank note cassette filling process. The absence of the bank note tag 32, or an incorrect comparison of the specific ID, indicates that the cassette 4 has been tampered with. As the value of the RF label 32 is small, the tag note 34 can either be dispensed as a valid bank note from the ATM in the usual manner, or purged during a "test cash" process.

In further embodiments of the present invention movement of the cassettes 4 outside of the ATM 2 can be recorded using antenna modules at the entrances to premises, cash-in-transit vehicles and cash centers, for example. This information may be relayed using one or more networks to a central computer for tracking purposes or automatically collected by an intelligent hand-held device, for example by a building security guard, for subsequent transmission or download to an asset tracking facility.

The embodiments of the present invention provide secure communications between the ATM and the cassettes without the need for a hard interface. An advantage over ordinary radio frequency communication is that no power is required in the cassette for communications, giving rise to a maintenance free operation in a secure environment.

What is claimed is:

1. An automated teller machine, ATM, comprising:

a removable cassette which contains sheet currency; and an enclosure arranged to receive the cassette therein, the enclosure including a transponder detector arranged to detect presence of the transponder, wherein the transponder detector comprises an antenna which spans the cassettes and arranged such that the transponder detector is capable of detecting the cassette when the cassette is located within the enclosure and not at other locations.

2. The ATM according to claim 1, wherein the transponder comprises a Radio Frequency Identity tag.

3. The ATM according to claim 1, wherein the transponder is arranged to transmit at least one item of data uniquely associated with the cassette when within range of the transponder detector.

4. The ATM according to claim 3, wherein the transponder detector comprises verification means for verifying that the item of data uniquely associated with the cassette is valid.

5. The ATM according to claim 4, wherein the verification means comprises (i) a data storage device having at least one valid data item scored therein and (ii) comparison means arranged to compare the item of data transmitted by the transponder with the at least one stored valid data item.

6. The ATM according to claim 4, wherein the verification means is arranged to be in communication with a communications network and is arranged to receive data relating to the cassette via the communications network.

7. The ATM according to claim 1, wherein the transponder detector comprises an interface arranged to output at least one alarm signal generated by the transponder detector.

8. The ATM according to claim 1, wherein the antenna is longer than a cassette.

9. An automated teller machine, ATM, comprising:

a removable cassette which contains sheet currency; and an enclosure arranged to receive the cassette therein, the enclosure including a transponder detector arranged to detect presence of the transponder, wherein the enclosure comprises a movable portion that in a first position prevents access to and from the enclosure, the movable portion comprising a further transponder arranged such that when the movable portion is not substantially in the first position the further transponder is nor detectable by the transponder detector.

10. An automated teller machine, ATM, comprising:

a) a removable cassette which contains sheet currency, and b) an enclosure arranged to receive the cassette therein, the enclosure including a transponder detector arranged to detect presence of the transponder wherein at least one of the sheets located within the portable container has a transponder attached thereto.

11. The ATM according to claim 10, wherein the transponder on the sheet is arranged to transmit to the transponder detector the value of the items within the portable container.

12. The ATM according to claim 11, wherein the transponder detector is in communication with a data entry device arranged to receive a user input of the value of the currency within the cassette, the transponder detector being further arranged to verity the user input value with the value received from the further transponder.

13. An automated teller machine, ATM, comprising:

a) one or more removable cassettes which contain currency;

b) a radio transponder affixed to each cassette;

c) a communication system which enables communication between a processor in the ATM and all transponders;

d) a radio transponder affixed to a sheet of currency within a cassette; and e) a system which detects presence of the radio transponder on the sheet, when within the cassette.

14. An automated teller machine, ATM, comprising:

a) a housing having i) a door, and ii) an antenna having a communication range;

b) an electronics module which uses the antenna to communicate;

c) one or more currency cassettes within the housing;

d) a radio transponder affixed to each currency cassette, which use the antenna to communicate with the electronics module;

e) a door radio transponder affixed to the door, such that i) when the door is in a first position, the door transponder is within the communication range, and is able to communicate with the electronics module; and ii) when the door is in a second position, the door transponder is outside the communication range, and cannot communicate with the electronics module.

15. The ATM according to claim 14, wherein the cassettes, prior to being inserted into the ATM, were loaded with sheet currency, and further comprising:

f) a radio transponder affixed to the last sheet loaded into each cassette.

* * * * *